United States Patent
Gali et al.

(10) Patent No.: US 11,064,162 B2
(45) Date of Patent: *Jul. 13, 2021

(54) INTELLIGENT VIDEO ANALYSIS SYSTEM AND METHOD

(71) Applicant: HANWHA TECHWIN CO., LTD., Seongnam-si (KR)

(72) Inventors: Muneswar Rao Gali, Changwon-si (KR); Durga Prasad Jujjuru, Changwon-si (KR); Seungho Jung, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/865,555

(22) Filed: May 4, 2020

(65) Prior Publication Data

US 2020/0267352 A1 Aug. 20, 2020

Related U.S. Application Data

(63) Continuation of application No. 14/606,209, filed on Jan. 27, 2015, now Pat. No. 10,681,312.

(30) Foreign Application Priority Data

Aug. 14, 2014 (KR) .................. 10-2014-0106227

(51) Int. Cl.
*H04N 7/18* (2006.01)
*G08B 13/196* (2006.01)

(52) U.S. Cl.
CPC ....... *H04N 7/181* (2013.01); *G08B 13/19608* (2013.01)

(58) Field of Classification Search
CPC .................. G08B 13/19608; H04N 7/181
See application file for complete search history.

(56) References Cited

U.S. PATENT DOCUMENTS

| 8,564,661 B2 | 10/2013 | Lipton et al. |
| 2005/0163212 A1* | 7/2005 | Henson ............ G08B 13/19613 375/240.01 |

(Continued)

FOREIGN PATENT DOCUMENTS

| CN | 101572804 A | 11/2009 |
| CN | 101674466 A | 3/2010 |

(Continued)

OTHER PUBLICATIONS

Communication dated Jun. 17, 2019, issued by the State Intellectual Property Office of P.R. China in counterpart Chinese Application No. 201510312251.8.

(Continued)

*Primary Examiner* — Jerry T Jean Baptiste
(74) *Attorney, Agent, or Firm* — Sughrue Mion, PLLC

(57) ABSTRACT

An intelligent video analysis method and system logically selects only surveillance cameras associated with an event and assigns different ranks to the selected surveillance cameras according to the importance thereof. Thereafter, more video analysis resources are assigned to a surveillance camera of high importance, thereby rapidly and efficiently performing video analysis.

16 Claims, 6 Drawing Sheets

(56) References Cited

U.S. PATENT DOCUMENTS

| | | | |
|---|---|---|---|
| 2009/0204707 A1* | 8/2009 | Kamegaya | H04L 67/125 709/224 |
| 2010/0097472 A1* | 4/2010 | Chathukutty | G08B 13/19645 348/159 |
| 2010/0132010 A1 | 5/2010 | Chatterton et al. | |
| 2010/0304731 A1 | 12/2010 | Bratton et al. | |
| 2011/0228984 A1* | 9/2011 | Papke | G06K 9/00771 382/103 |
| 2011/0273567 A1 | 11/2011 | Bhan | |
| 2013/0011014 A1 | 1/2013 | Jin et al. | |
| 2013/0040660 A1 | 2/2013 | Fisher et al. | |
| 2015/0015717 A1 | 1/2015 | Dong et al. | |
| 2015/0116498 A1 | 4/2015 | Vartiainen et al. | |

FOREIGN PATENT DOCUMENTS

| | | |
|---|---|---|
| CN | 101695125 A | 4/2010 |
| CN | 102065279 A | 5/2011 |
| CN | 102724482 A | 10/2012 |
| CN | 102860003 A | 1/2013 |
| CN | 103763513 A | 4/2014 |
| CN | 103856762 A | 6/2014 |
| KR | 10-0876494 B1 | 12/2008 |

OTHER PUBLICATIONS

Notice of Allowance issued in parent U.S. Appl. No. 14/606,209 dated Jan. 31, 2020.
Non-Final Office Action issued in parent U.S. Appl. No. 14/606,209 dated Jul. 5, 2019.
Final Office Action issued in parent U.S. Appl. No. 14/606,209 dated Nov. 2, 2018.
Non-Final Office Action issued in parent U.S. Appl. No. 14/606,209 dated Apr. 5, 2018.
Final Office Action issued in parent U.S. Appl. No. 14/606,209 dated Oct. 18, 2017.
Non-Final Office Action issued in parent U.S. Appl. No. 14/606,209 dated Apr. 4, 2017.

* cited by examiner

Found stolen vehicle

Found suspected vehicle

Found stolen vehicle

INTELLIGENT VIDEO ANALYSIS SYSTEM AND METHOD

CROSS-REFERENCE TO THE RELATED APPLICATION

This is a continuation of U.S. application Ser. No. 14/606,209 filed on Jan. 27, 2015, which claims priority from Korean Patent Application No. 10-2014-0106227, filed on Aug. 14, 2014, in the Korean Intellectual Property Office, the disclosure of which is incorporated herein in its entirety by reference.

BACKGROUND

1. Field

Methods and apparatuses consistent with exemplary embodiments relate to intelligent video analysis.

2. Description of the Related Art

Video analysis is performed by receiving videos captured by at least one camera, analyzing contents of the videos, and extracting characteristics of the videos. In the related art, it is inefficient that videos transmitted from all cameras are analyzed without any priority thereto when a specific event occurs.

SUMMARY

Exemplary embodiments of the inventive concept provide a system and method which analyze only videos related to an occurred event, thereby reducing resources and a time required for the video analysis and increasing efficiency.

Various aspects of the embodiments will be set forth in part in the description which follows and, in part, will be apparent from the description, or may be learned by practice of the presented embodiments.

According to an exemplary embodiment, there is provided a method of analyzing a video by an intelligent video analysis system. The method may include: setting ranks to a plurality of cameras, respectively, based on information about an event detected by a camera among the plurality of cameras, the setting performed by an intelligent rank setting processor; and performing load balancing with respect to data transmitted from the plurality of cameras based on the ranks set to the plurality of cameras, the load balancing performed by a video analysis server that performs video analysis.

The method may further include generating at least one logical camera group related to the camera detecting the event based on the information about the event, the at least one logical camera group including one or more cameras among the plurality of cameras.

The performing the load balancing may be performed by assigning more resources for processing data to a camera having a higher rank than a camera having a lower rank among the plurality of cameras to which the ranks are set.

The setting the ranks to the plurality of cameras may be performed based on event metadata related to the event. The event metadata may include information about at least one of a type of the event, a time when the event occurs, a location where the event occurs, proximity of the location where the event occurs, a direction of movement of an object in the event, a moving speed of the object in the event, and attribute of the object in the event.

In the above, method, higher ranks may be set to the one or more cameras in the at least one logical camera group than a camera not included in the at least one logical group, and the one or more cameras may be given different weights, respectively, based on the event metadata. Thus, the load balancing may be performed further based on the different weights.

The one or more cameras included in the at least one logical group may be disposed within a predetermined distance from the camera detecting the event, or may be physically connected to the camera detecting the event.

According to another exemplary embodiment, there is provided an intelligent video analysis system for analyzing a video which may include: an intelligent rank setting processor configured to set ranks to a plurality of cameras, respectively, based on information about an event detected by a camera among the plurality of cameras; and a load balancing processor configured to perform load balancing with respect to data transmitted from the plurality of cameras based on the ranks set to the plurality of cameras. The system may further include a logical camera group generator configured to generate at least one logical camera group related to the camera detecting the event, based on the information about the event, the at least one logical camera group comprising one or more cameras among the plurality of cameras.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
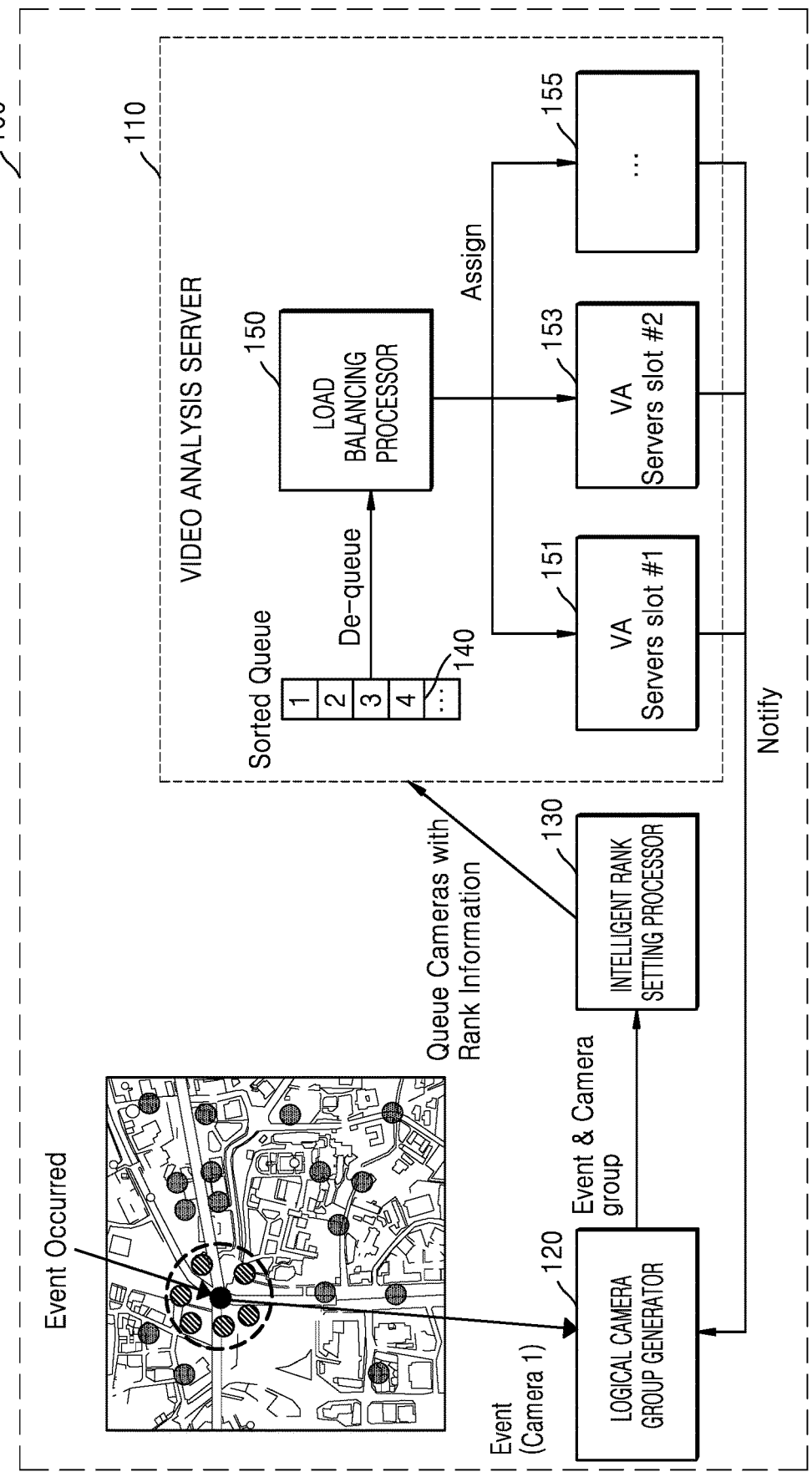
FIG. 1 illustrates an intelligent video analysis system, according to an exemplary embodiment.

Reference will now be made in detail to exemplary embodiments, which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. The following description and drawings appended herein are provided for a better understanding of the inventive concept, and parts of the description and drawings that are obvious to those of ordinary skill in the technical field may be omitted here.

The present specification and drawings are not intended to restrict the scope of the inventive concept which is defined by the appended claims. The terms used herein are chosen to appropriately express the inventive concept and should be thus construed based on the meanings and concept according to the technical idea of the inventive concept.

As used herein, the term "and/or" includes any and all combinations of one or more of the associated listed items. Expressions such as "at least one of," when preceding a list of elements, modify the entire list of elements and do not modify the individual elements of the list.

FIG. 1 illustrates an intelligent video analysis system 100 according to an exemplary embodiment.

Figure 2:
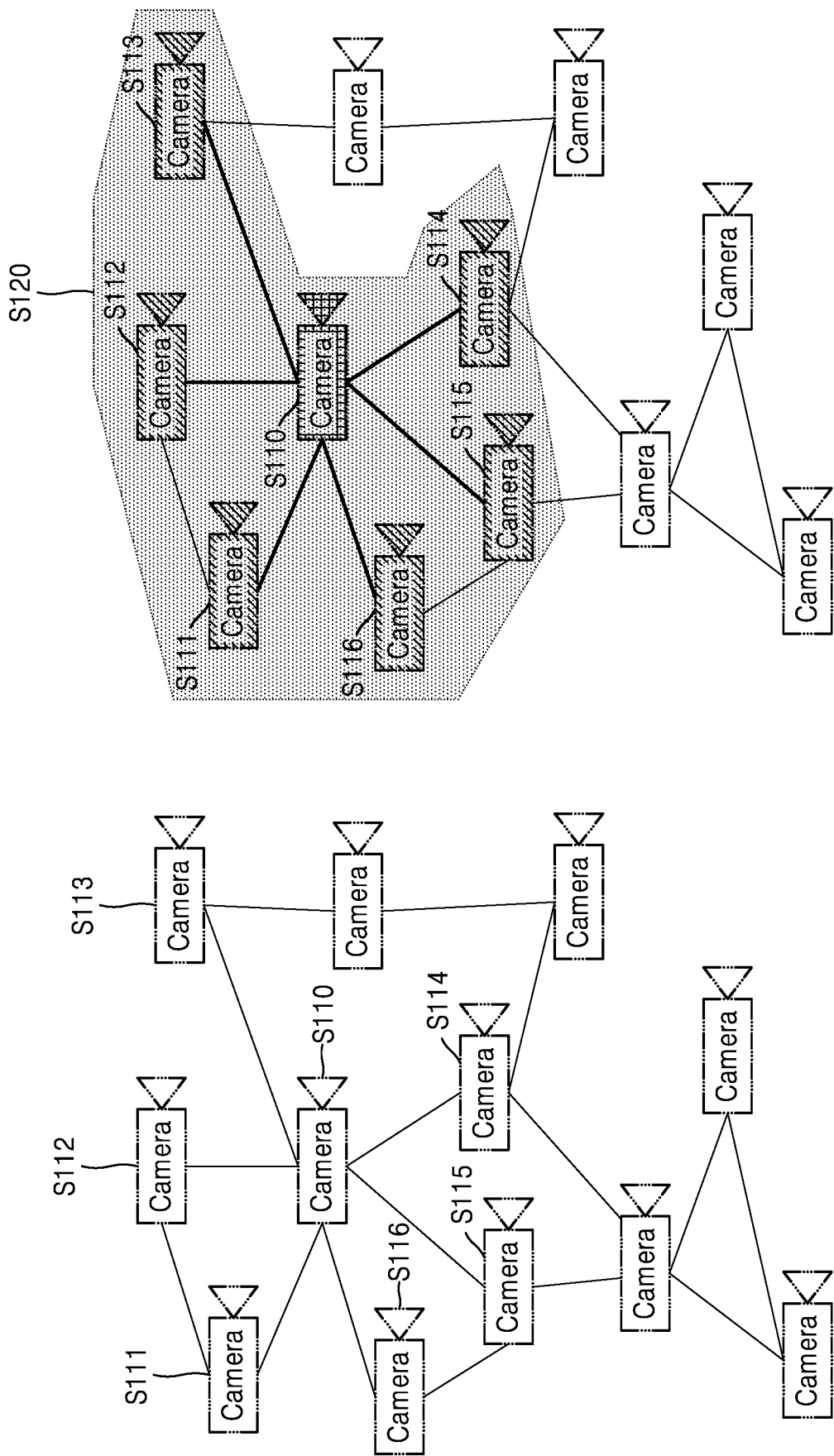
FIGS. 2 and 3 are diagrams illustrating methods of logically generating a camera group performed by a logical camera group generator of an intelligent video analysis system, according to exemplary embodiments.

The intelligent video analysis system 100 includes surveillance cameras S110 to S116 of FIG. 2 installed in specific regions to watch the specific regions and detect an event, a video analysis server 110 for storing, managing, and analyzing videos received from the surveillance cameras S110 to S116, a logical camera group generator 120 for grouping the surveillance cameras S110 to S116 based on a relationship between the surveillance cameras S110 to S116 and an event, and an intelligent rank setting processor 130 for setting ranks of cameras belonging to a logical camera group.

The surveillance cameras S110 to S116 are respectively installed in regions that a user desires to watch or monitor. The surveillance cameras S110 to S116 detect an event. The event includes both a video event and a voice event. Examples of the event includes a video set by a user, detection of a fire, detection of a stolen vehicle, detection of a motion in a specific region, detection of a specific object or person, a sound generated when an object is damaged, a noise, a sound of running, a scream, a sound of explosion, a horn, a sound of fighting, a sound of music, a sound set by the user, etc.

The surveillance cameras S110 to S116 are configured to store obtained video/audio data in a local/remote control storage device in the form of a file or database. The intelligent video analysis server 110 analyzes the stored video/audio data.

According to an exemplary embodiment, the intelligent video analysis server 110 analyzes only video and/or audio data transmitted from the surveillance cameras S110 to S116 belonging to a logical camera group S120 generated by the logical camera group generator 120.

The intelligent video analysis server 110 may set ranks to the respective surveillance cameras S110 to S116 belonging to the logical camera group S120, and assign more resources to analyzing data of a surveillance camera of a high rank.

According to an exemplary embodiment, the logical camera group generator 120 generates a logical camera group by logically detecting cameras related to a camera that detects an event.

Figure 3:
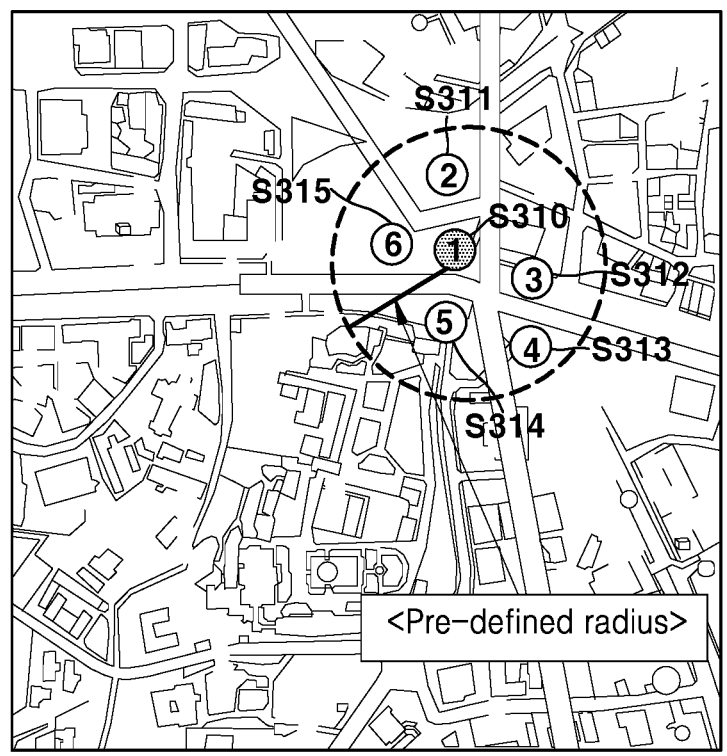

FIGS. 2 and 3 are diagrams illustrating methods of logically generating a camera group used by a logical camera group generator of an intelligent video analysis system, according to exemplary embodiments.

According to an exemplary embodiment, the logical camera group generator 120 of FIG. 1 may generate a logical camera group by grouping, into a logical camera group, surveillance cameras that are physically connected to a surveillance camera detecting an event or surveillance cameras that are within a predetermined radius from the surveillance camera detecting the event.

According to an exemplary embodiment, referring to FIG. 2, the logical camera group generator 120 detects surveillance cameras S111, S112. S113, S114. S115, and S116, which are physically connected to a surveillance camera S110 detecting an event, as cameras related to the surveillance camera S110 and groups the detected cameras into a logical camera group.

According to an exemplary embodiment, referring to FIG. 3, the logical camera group generator 120 detects surveillance cameras S311, S312. S313, S314, and S315, which are within a predetermined radius from the location of a surveillance camera S310 detecting an event, as cameras related to the surveillance camera S110, and groups the detected cameras into a logical camera group.

According to an exemplary embodiment, the logical camera group generator 120 generates a logical camera group by logically detecting cameras related to a surveillance camera detecting an event, based on event metadata.

According to an exemplary embodiment, the event metadata is information for detecting features of the event. According to an exemplary embodiment, the event metadata may be used for a video server to analyze data transmitted from the surveillance cameras so as to generate a logical camera group or set ranks to surveillance cameras belonging to a logical camera group.

The event metadata includes information about at least one of a type of the event, a time when the event occurred, a location where the event occurred, proximity of the location where the event occurred, a direction in which at least one object moves in the event, a moving speed of the at least one object in the event, and attribute of the at least one object in the event. In this case, the attribute information of the at least one object in the event includes color, size, number and the like of the at least one object.

According to an exemplary embodiment, the type of the event includes fire, disaster, emergency, accident, theft, trespass, etc. In the information of the date and lime when the event occurred, a different weight may be assigned according to whether the event occurred on a weekday or a weekend, whether the event occurred in the daytime or the nighttime, etc.

In the information about the location where the event occurred, a high weight may be assigned to a dangerous region, a main region to be monitored, etc. For example, when an event related to a car accident is detected, a high weight may be assigned to a crossroad, etc.

The information about the proximity of the location where the event occurred may be set such that a high weight is assigned to a surveillance camera near a location where the event is detected.

Figure 6:
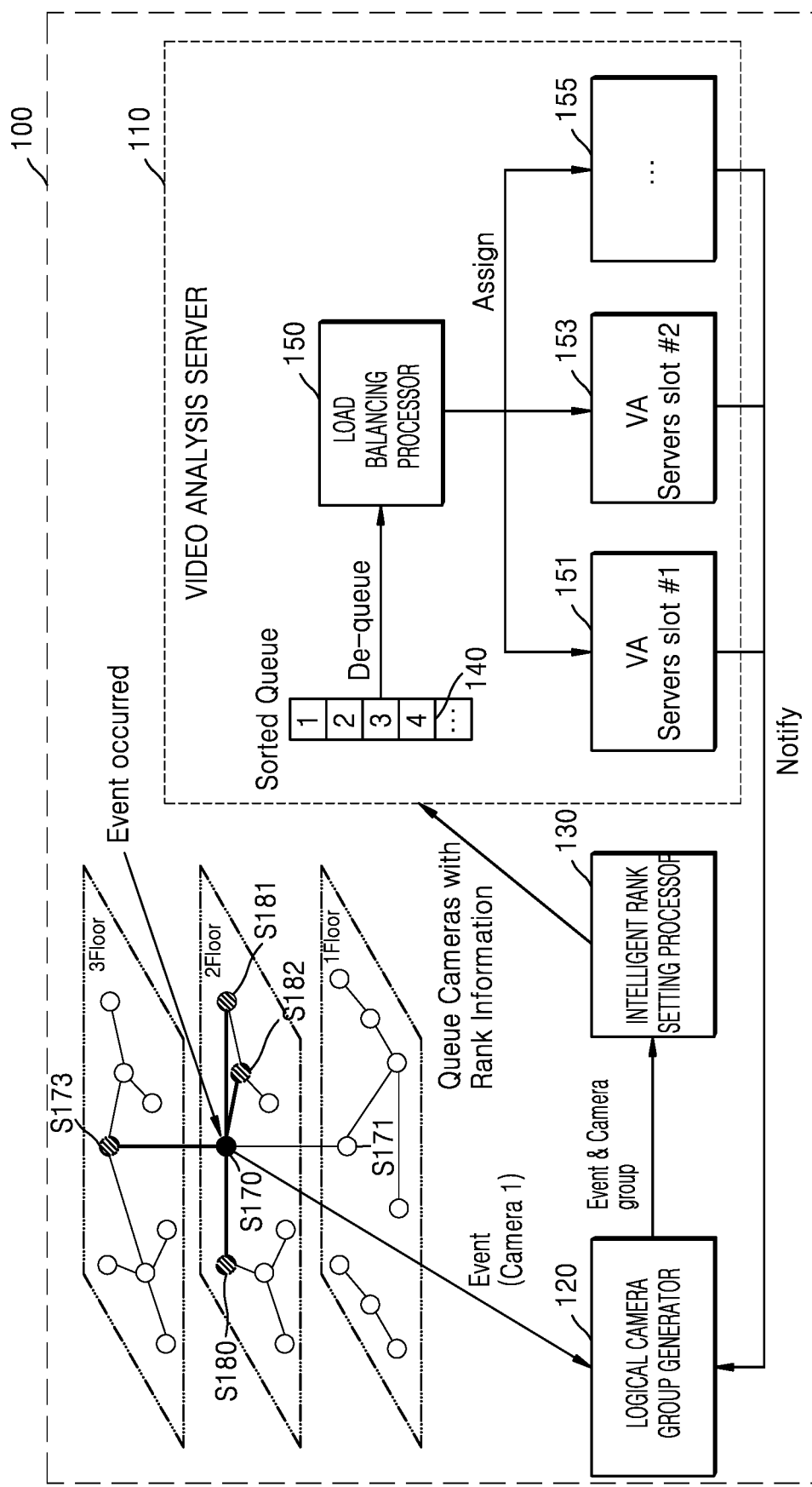
FIG. 6 is a diagram illustrating a method of using an intelligent video analysis system for management of a building, according to an exemplary embodiment.

According to an exemplary embodiment, the logical camera group generator 120 may generate a logical camera group, based on the location of a surveillance camera detecting an event According to an exemplary embodiment, referring to FIG. 6, if a thief is detected on a second floor of a building, a surveillance camera installed at a first-floor exit S171 and a surveillance camera installed at a third-floor exit Si 73 may be grouped into a logic camera group when a surveillance camera detecting the thief is located at an exit.

Figure 4:
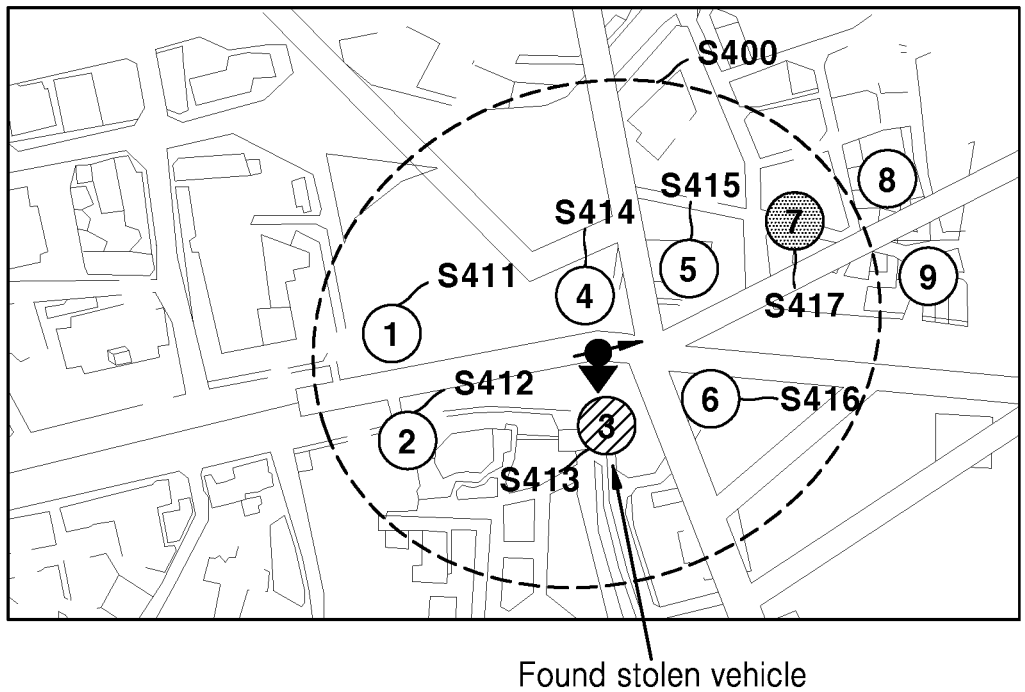
FIGS. 4 and 5 are diagrams illustrating methods of logically generating a camera group based on event metadata, according to exemplary embodiments.
Figure 5:
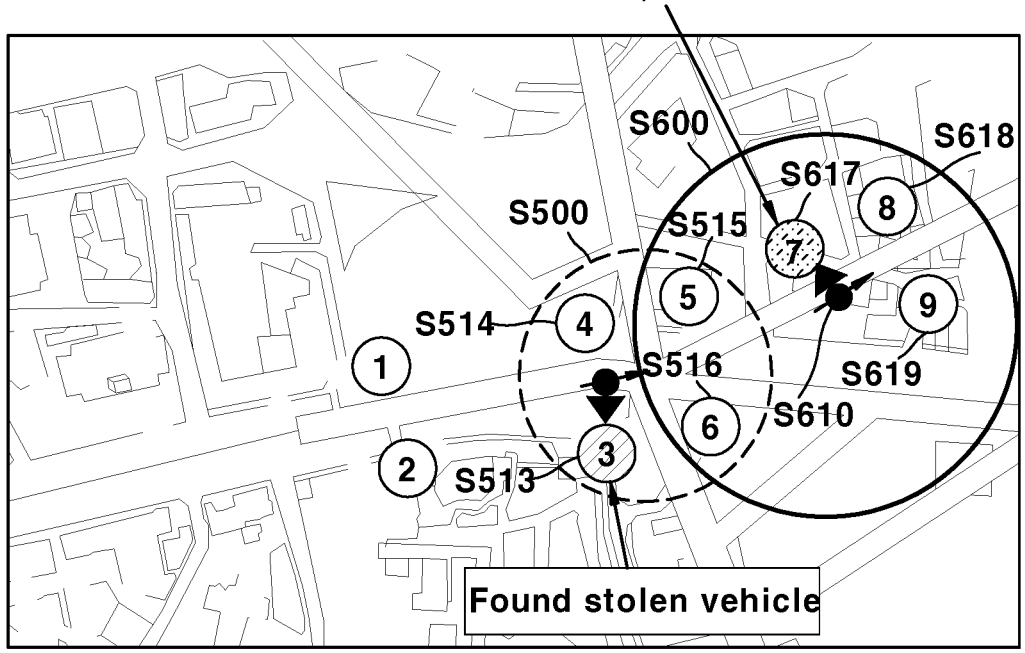

FIGS. 4 and 5 are diagrams illustrating a method of generating a logical camera group performed by a logical camera group generator and a method of setting ranks to cameras belonging to the logical camera group performed by an intelligent rank setting unit, according to exemplary embodiments.

FIG. 5 illustrates a method of setting a priority for each of a plurality of logical camera groups when the plurality of logical camera groups are present according to another exemplary embodiment.

The intelligent rank setting processor 130 of FIG. 1 may assign weights to cameras belonging to a logical camera group by assigning weights to pieces of information constituting event metadata representing features of an occurred event, based on Equation 1 below.

$$Rank = Pc * \Sigma x_i w_i \quad \text{[Equation 1]}$$

In Equation 1, 'Pc' denotes a priority assigned to a surveillance camera, '$x_i$' denotes each of pieces of information constituting event metadata, and '$w_i$' denotes weights assigned to the pieces of the information constituting the event metadata. 'Pc' denoting the priority assigned to a surveillance camera may be set according to a priority assigned to a logical camera group to which the surveillance camera belongs or may be set by a user.

According to an exemplary embodiment, referring to FIG. 4, a third surveillance camera S413 detects a stolen vehicle and informs a video analysis system of the detection of an event. In this case, information about a moving speed of the stolen vehicle (e.g., 90 km/h), information about a direction of movement of the stolen vehicle, etc. may be used as event metadata.

The logical camera group generator 120 of FIG. 1 may generate a logical camera group, based on a location of the surveillance camera detecting an event and information S410 about a direction of movement of an object in the event.

Referring to FIG. 4, the logical camera group generator 120 groups, into a logical camera group S400, a first surveillance camera S411, a second surveillance camera S412, a fourth surveillance camera S414, a fifth surveillance camera S415, a sixth surveillance camera S416, and a seventh surveillance camera S417, which are within a predetermined range from the third surveillance camera S413 that first detects the stolen vehicle.

Then, the intelligent rank setting processor 130 of FIG. 1 sets ranks to the surveillance cameras S411 to S417 belonging to the logical camera group S400. In this case, the intelligent rank setting processor 130 may set ranks to the surveillance cameras S411 to S417, based on information about a moving speed of the stolen vehicle (e.g., 90 km/h) and information about a direction of movement of the stolen vehicle that are contained in the event metadata.

For example, when the stolen vehicle is moving to the east, the first surveillance camera S411, the second surveillance camera S412, and the fourth surveillance camera S414 located opposite the direction of movement of the stolen vehicle need not be considered.

The fifth surveillance camera S415, the sixth surveillance camera S416, and the seventh surveillance camera S417 that are located in the direction of movement of the stolen vehicle should be first considered. A higher rank may be assigned to the seventh surveillance camera S417 among the fifth surveillance camera S415, the sixth surveillance camera S416, and the seventh surveillance camera S417, since the stolen vehicle may pass by the fifth surveillance camera S415 and the sixth surveillance camera S416 in ten seconds when the moving speed of the stolen vehicle is considered.

Therefore, the intelligent rank setting processor 130 may assign a highest rank to the seventh surveillance camera S417 and next ranks to the fifth surveillance camera S415 and the sixth surveillance camera S416 among the surveillance cameras S411 to S417 belonging to the logical camera group S400. Also, a higher rank may be assigned to a surveillance camera that is closer to the direction of movement of the stolen vehicle among the fifth surveillance camera S415 and the sixth surveillance camera S416.

In addition, the intelligent rank setting processor 130 may assign lower ranks to the first surveillance camera S411, the second surveillance camera S412, and the fourth surveillance camera S414. In this case, the intelligent rank setting processor 130 may set ranks to the surveillance cameras S411 to S417 by assigning a weight to each of at least one of the pieces of information constituting the event metadata.

The intelligent rank setting processor 130 provides a queue 140 included in the intelligent video analysis server 110 of FIG. 1 with information about at least one surveillance camera belonging to the logical camera group S400 together with information about the ranks of the surveillance cameras.

For example, the intelligent rank setting processor 130 provides the queue 140 included in the intelligent video analysis server 110 with information about the seventh surveillance camera S417 and information that the seventh surveillance camera S417 ranks first in the logical camera group S400. Thereafter, when the fifth surveillance camera S415 ranks second in the logical camera group S400, information about the fifth surveillance camera S415 and information that the fifth surveillance camera S415 ranks second are provided to the queue 140. When the sixth surveillance camera S416 ranks third in the logical camera group S400, information about the sixth surveillance camera S416 and information that the sixth surveillance camera S416 ranks third are provided to the queue 140.

In addition, information related to the first surveillance camera S411, the second surveillance camera S412, and the fourth surveillance camera S414 may be set to be provided to or not be provided to the queue 140 included in the video analysis server 110, based on predetermined criteria.

FIG. 5 illustrates a case in which a plurality of logical camera groups are generated, according to an exemplary embodiment.

FIG. 5 illustrates a case in which a third surveillance camera S513 first detects a stolen vehicle, and a seventh surveillance camera S617 detects a suspected stolen vehicle, and the third and seventh surveillance cameras S513 and S617 each inform the intelligent video analysis system 100 of the detection of an event. In this case, the third surveillance camera S513 and the seventh surveillance camera S617 may each inform the intelligent video analysis server 110 of FIG. 1 of the detection of the event.

After the event is detected, each of the third surveillance camera S513 and the seventh surveillance camera S617 extracts event metadata representing the event according to the detected event. Referring to FIG. 5, the third surveillance camera S513 and the seventh surveillance camera S617 may extract, as event metadata, information regarding a moving speed and a direction of movement of the detected stolen vehicle and the detected suspected stolen vehicle.

Then, the logical camera group generator 120 of FIG. 1 may generate a logical camera group by detecting cameras that are within a predetermined range from the location of each of the third and seventh surveillance cameras S513 and S617.

In detail, the logical camera group generator 120 generates a first logical camera group S500 by detecting a fourth surveillance camera S514, a fifth surveillance camera S515, and a sixth surveillance camera S516 in relation to the third surveillance camera S513.

Also, the logical camera group generator 120 generates a second logical camera group S600 by detecting a fifth surveillance camera S515, a sixth surveillance camera S516, an eighth surveillance camera S618, and a ninth surveillance camera S619 in relation to the seventh surveillance camera S617.

The intelligent rank setting processor 130 of FIG. 1 may be configured to assign a higher weight to the second logical camera group S600 among the first logical camera group S500 and the second logical camera group S600 but may be configured differently by a user.

For example, the intelligent rank setting processor 130 may be configured to assign a higher weight to the second logical camera group S600 when a stolen vehicle is being chased, and a higher weight to the first logical camera group S500 when a situation in which a vehicle was stolen needs to be investigated.

According to an exemplary embodiment, it is assumed that a stolen vehicle is being chased and a higher weight is assigned to the second logical camera group S600 to which the seventh surveillance camera S617 detecting the stolen vehicle belongs.

In this case, in Equation 1, a higher priority Pc is assigned to a surveillance camera belonging to the second logical camera group S600. That is, weights Pc assigned to the respective fifth, sixth, eighth and ninth surveillance cameras S515, S516, S618, and S619 may be higher than weights Pc assigned to the third and fourth surveillance cameras S513 and S514.

A direction of movement of the stolen vehicle may be considered when a rank of each camera is set. In this case, higher weights $w_i$ are assigned to the eighth surveillance camera S618 and the ninth surveillance camera S619 than weights $w_i$ assigned to the fifth surveillance camera S515 and the sixth surveillance camera S516 among the surveillance cameras belonging to the second logical camera group S600.

The intelligent rank setting processor 130 may set ranks to the surveillance cameras belonging to the first logical camera group S500 and the second logical camera group S600 by performing the above process or a process of additionally considering event metadata.

Referring to FIG. 5, first to seventh ranks may be assigned to the eighth surveillance camera S618, the ninth surveillance camera S619, the seventh surveillance camera S617, the third surveillance camera S513, the fifth surveillance camera S515, the sixth surveillance camera S516, and the seventh surveillance camera S617, respectively.

In this case, the intelligent rank setting processor 130 may transmit information and ranking information about these surveillance cameras to the video analysis server 110. The intelligent video analysis server 110 may assign resources such as slots by using a load balancing processor 150, based on the order of the ranks of these surveillance cameras.

According to an exemplary embodiment, the intelligent rank setting processor 130 may transmit information and ranking information about all the surveillance cameras belonging to the logical camera groups to the video analysis server 110.

According to an exemplary embodiment, the intelligent rank setting processor 130 may transmit to the intelligent video analysis server 110 only information about surveillance cameras of a particular rank or higher among information about surveillance cameras belonging to a logical camera group. For example, referring to FIG. 5, the intelligent rank setting processor 130 may be configured to transmit information about surveillance cameras of the fourth rank or higher. In this case, the intelligent rank setting processor 130 transmits to the intelligent video analysis server 110 only information about the eighth surveillance camera S618, the ninth surveillance camera S619, the seventh surveillance camera S617 and the third surveillance camera S513 together with ranking information about these surveillance cameras.

The load balancing processor 150 of the intelligent video analysis server 110 assigns video slots based on the information and ranking information about the surveillance cameras received from the intelligent rank setting processor 130.

In this case, the load balancing processor 150 may change the number of video slots to be assigned, based on the ranks of the surveillance cameras.

Referring to FIG. 5, when all the information about the third to ninth surveillance cameras S513 to S619 is received, the intelligent video analysis server 110 may assign a largest number of video slots to the eighth surveillance camera S618 of the first rank and a smallest number of video slots to the seventh surveillance camera S617 of a lowest rank.

According to an exemplary embodiment, when all the information of the third to ninth surveillance cameras S513 to S619 is received, the intelligent video analysis server 110 may be configured to assign video slots to only surveillance cameras of the fifth rank or higher, based on settings determined by a user.

According to an exemplary embodiment, the load balancing processor 150 of the intelligent video analysis server 110 may be configured to assign video slots by sequentially reading information about surveillance cameras that is sorted in the queue 140.

In the queue 140, the information about the surveillance cameras is sorted in ascending order of ranks. Referring to FIG. 5, the information about the eighth surveillance camera S618 of the first rank is first input to the queue 140, and the load balancing processor 150 first reads this information and assigns a slot for analyzing the information about the eighth surveillance camera S618.

FIG. 6 is a diagram illustrating a method of using an intelligent video analysis system for management of a building, according to an exemplary embodiment.

The intelligent video analysis system 100 installs surveillance cameras in internal regions of a building to be watched or monitored, and the surveillance cameras detect an event occurring in each of the regions and transmit information regarding the detected event to the intelligent video analysis server 110 or a separate storage server.

The logical camera group generator 120 generates at least one logical camera group related to at least one surveillance camera detecting an event. For management of the building, the logical camera group generator 120 may set as a logical camera group a floor of the building on which a surveillance camera detecting an event is installed.

For example, when a burglary event is detected at a central position S170 on the second floor of the building, the logical camera group generator 120 may generate a logical camera group including surveillance cameras S180, S181, and S182 that are within a predetermined radius from a surveillance camera located on the central position S170.

In this case, the logical camera group generator 120 may be configured to generate one logical camera group including all surveillance cameras installed on the second floor of the building.

The intelligent rank setting processor 130 sets ranks to cameras belonging to a logical camera group, based on event metadata. For example, when a thief moves in a right direction after a burglary event is detected at the central position S170 on the second floor of the building, a low rank may be assigned to the surveillance camera S180 located at a left side of the central position S170 and high ranks may be assigned to surveillance cameras S181 and S182 located at a right side of the central position S170.

According to another exemplary embodiment, when a burglary event is detected at the central position S170 on the second floor and an exit to the first or third floor of the building is present at the central position S170, a central position S171 on the first floor and a central position S173 on the third floor may be grouped into one logical camera group.

When surveillance cameras on the central positions S170, S171, and S183 on the first to third floors are grouped into one logical camera group, the intelligent rank setting processor 130 may assign ranks to the surveillance cameras based on a path and direction of movement of the thief detected on the second floor.

For example, when a thief moves to the central position S173 on the third floor via the exit after the thief is detected at the central position S170 on the second floor, the intelligent rank setting processor 130 may assign a highest rank to the central position S173 on the third floor on which the thief can be found, a middle rank to the central position S170 on the second floor on which the thief was detected, and a lowest rank to the central position S171 on the first floor.

In this case, data transmitted from a surveillance camera installed at the central position S173 on the third floor is first input to the queue 140 of the video analysis server 110. Then, data transmitted from a surveillance camera installed at the central position S170 on the second floor is input to the queue 140. Lastly, data transmitted from a surveillance camera installed at the central position S171 on the first floor is input to the queue 140.

After the load balancing processor 150 receives data transmitted from the queue 140, the load balancing processor 150 assigns a slot for processing data transmitted from the surveillance camera installed at the central position S173 on the third floor to a first video analysis (VA) server 151, a slot for processing data transmitted from the surveillance camera installed at the central position S170 on the second floor to a second VA server 153, and a slot for processing data transmitted from the surveillance camera installed at the central position S171 on the first floor to a third VA server 155.

The load balancing processor 150 may differently set the number of slots to be assigned to each of the first VA server 151, the second VA server 153, and the third VA server 155. The load balancing processor 150 may be configured to assign a largest number of slots to analyze data transmitted from the surveillance camera installed at the central position S173 on the third floor of highest priority among the three positions S171. S170, and S173.

Figure 7:
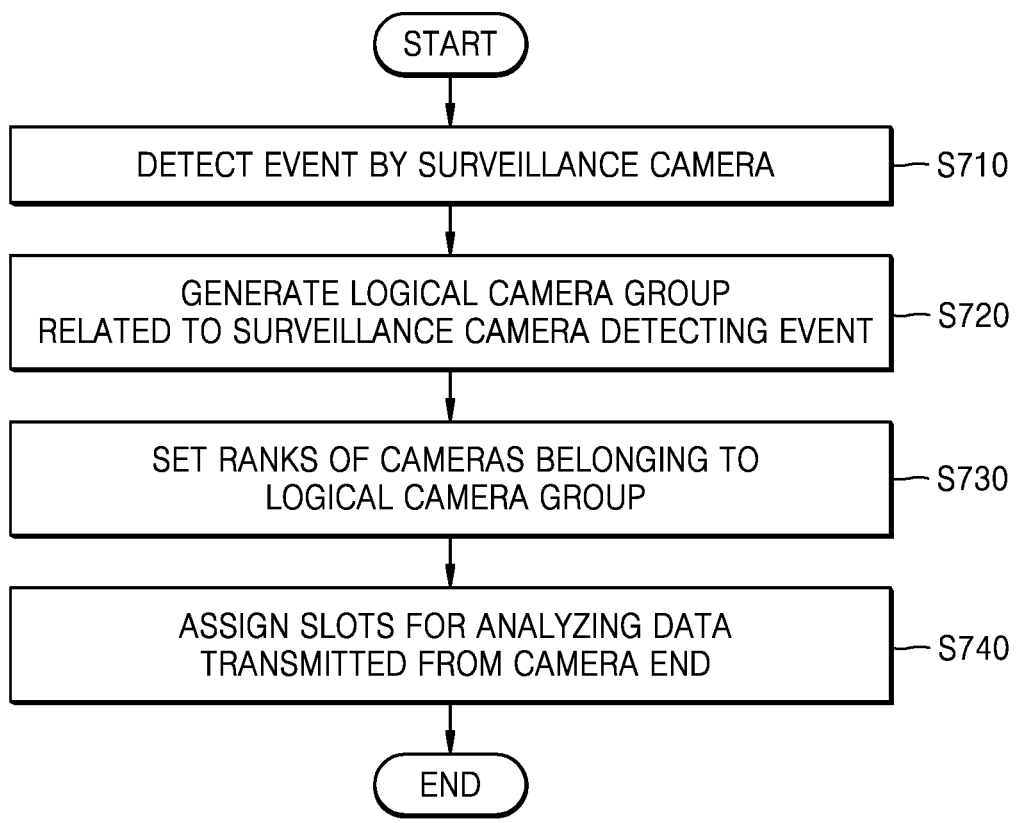
FIG. 7 is a flowchart of a method of analyzing a video using an intelligent video analysis system, according to an exemplary embodiment.

FIG. 7 is a flowchart of a method of analyzing a video using an intelligent video analysis system, according to an exemplary embodiment.

In an intelligent video analysis system, a surveillance camera watches and monitors a particular region and detects an event when the event occurs in the particular region. When an event is detected by the surveillance camera (operation S710), a logical camera group related to the surveillance camera detecting the event is generated (operation S720). The logical camera group may be generated by determining that surveillance cameras, which are physically within a distance of a predetermined radius from the surveillance camera detecting the event, are related to the surveillance camera detecting the event and grouping the surveillance cameras into a logical camera group. Also, surveillance cameras that are logically related to the surveillance camera detecting the event may be grouped into a logical camera group according to a type of the detected event.

When a thief is found at an exit on a second floor of a building as in the embodiment of FIG. 6, surveillance cameras installed on the second floor on which the thief may move may be grouped into a logical camera group, and exits on the respective first to third floors of the building may be grouped into a logical camera group considering that the thief may move to an exit. According to an exemplary embodiment, at least one logical camera group may be generated (operation S720).

After the at least one logical camera group is generated, a priority may be assigned to each of the at least one logical camera group and ranks may be assigned to surveillance cameras belonging to each of the at least one logical camera group (operation S730).

After the ranks are assigned to the surveillance cameras, a video analysis server may assign resources such as slots according to the ranks (operation S740).

As described above, according to the above exemplary embodiments, an intelligent video analysis system logically selects only surveillance cameras related to an event. Then ranks are assigned to the logically selected surveillance cameras based on event metadata representing a relevance to the event, and a video server assigns slots in ascending order of the ranks of the surveillance cameras, thereby reducing the number of surveillance cameras to be used to analyze a video.

Also, only surveillance cameras that are highly associated with the event may be selected to reduce resources and costs for analyzing a video. Also, a video can be rapidly analyzed by assigning ranks to the surveillance cameras that are highly associated with the event.

The above exemplary embodiments can be implemented as computer readable code in a computer readable recording medium. The computer readable recording medium may be any recording apparatus capable of storing data that can be read by a computer system.

Examples of the computer readable recording medium include a read-only memory (ROM), a random access memory (RAM), a compact disc (CD)-ROM, a magnetic tape, a floppy disk, an optical data storage device, and so on. The computer readable medium can be distributed among computer systems that are interconnected through a network, and the computer readable code may be stored and implemented in the distributed system.

At least one of the components, elements or units represented by a block as illustrated in FIGS. 1 and 6 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

It should be understood that the exemplary embodiments described herein should be considered in a descriptive sense only and not for purposes of limitation. Descriptions of features or aspects within each embodiment should typically be considered as available for other similar features or aspects in other embodiments.

While exemplary embodiments have been described with reference to the figures, it will be understood by those of ordinary skill in the art that various changes in form and details may be made therein without departing from the spirit and scope of the inventive concept as defined by the following claims.

What is claimed is:

1. A video surveillance method comprising:
   receiving information including event metadata about an event of an object that is detected by at least one camera among a plurality of cameras, the event metadata indicating an event type, an event time, an event location, and a direction and a speed of the object;
   selecting at least one logical camera group from the plurality of cameras;
   dynamically allocating resources to cameras of the at least one logical camera group for network load balancing by changing a number of video slots to be assigned to the plurality of cameras based on the event metadata;
   wherein the selecting of the at least one logical camera group further comprises:
      grouping cameras that are physically connected to the at least one camera that detected the event as a physically connected camera group; and
      logically selecting cameras, which are related to the event, from among the physically connected camera group, based on the event metadata.

2. The method of claim 1, the at least one camera analyzes at least one captured video for the event, and a video analysis server performs further analysis based on the at least one captured video based on the event metadata.

3. The method of claim 1, wherein elements of the event metadata are given different weights, and
   wherein the number of video slots to be assigned to the plurality of cameras are changed based on the elements of the event metadata and corresponding weight values of the elements of the event metadata.

4. The method of claim 1, wherein when the event is related to a moving object, the event metadata comprises information about at least one of a type of the event, a time when the event occurs, a location where the event occurs, a direction and a speed of the moving object, and an attribute of the moving object.

5. The method of claim 1, further comprising assigning priorities to the cameras of the at least one logical camera group, respectively, based on the event metadata.

6. The method of claim 2, at least one algorithm is selected for the further analysis, by the video analysis server, of the at least one captured video based on the event metadata.

7. A video surveillance method comprising:
   detecting an event of an object by at least one camera among a plurality of cameras;
   sending information including event metadata about the event, the event metadata indicating event type, event time, event location, and a direction and speed of the object; and
   receiving a resource allocation,
   wherein the resource allocation is performed by dynamically allocating resources to cameras of at least one logical camera group based on respective priority values of the cameras of the at least one logical camera group with respect to a relevance to the event, and
   wherein the at least one logical camera group is selected from the plurality of cameras by selecting cameras having a physical network connection with the at least one camera, the cameras of the at least one logical camera group being within a certain radius from the at least one camera, or cameras being within a surveillance zone of the at least one camera.

8. The method of claim 7, wherein elements of the event metadata are given different weight values, and wherein the resource allocation is performed further based on the different weight values.

9. The method of claim 7, wherein when the at least one logical camera group is selected from the plurality of cameras by selecting cameras having the physical network connection with the at least one camera, logically selecting cameras, which are related to the event, from among the plurality of cameras having the physical network connection with the at least one camera, based on the event metadata is performed by a logical camera group generating processor.

10. The method of claim 9, wherein a video analysis server performs further analysis based on at least one captured video transmitted from the cameras of the logically selected cameras from among the cameras having the physical network connection with the at least one camera based on the event metadata.

11. The method of claim 7, wherein a video analysis server performs further analysis based on at least one captured video transmitted from the cameras of the at least one logical camera group based on the event metadata.

12. The method of claim 10, wherein at least one algorithm is selected for the further analysis, by the video analysis server, of the at least one captured video based on the event metadata.

13. The method of claim 11, wherein at least one algorithm is selected for the further analysis, by the video analysis server, of the at least one captured video based on the event metadata.

14. The method of claim 7, wherein the relevance to the event is determined by elements of the event metadata and corresponding weight values of the elements of the event metadata.

15. A video analysis system for analyzing a video, the video analysis system comprising:
   a logical camera group generator configured to generate at least one logical camera group related to a camera detecting an event;
   a load balancing processor configured to perform load balancing with respect to data transmitted from a plurality of cameras based on a relevance to the event,
   a video analysis server performing further analysis based on event metadata about the event detected by the camera among the plurality of cameras; and
   wherein the logical camera group generator is further configured to group cameras that are physically connected to the camera that detected the event as a physically connected camera group, and logically select cameras, which are related to the event, from among the cameras of the physically connected camera group, based on the event metadata.

16. The system of claim 15, wherein at least one algorithm is selected for the further analysis, by a video analysis server, of at least one captured video based on the event metadata.

* * * * *